UNITED STATES PATENT OFFICE.

FRITZ ULLMANN, OF CHARLOTTENBURG, GERMANY, ASSIGNOR TO ACTIEN GESELL-SCHAFT FÜR ANILIN FABRIKATION, OF BERLIN, GERMANY.

PRODUCT OF THE ANTHRAQUINONE SERIES AND PROCESS OF MAKING SAME.

1,001,325.  Specification of Letters Patent.  Patented Aug. 22, 1911.

No Drawing.   Application filed November 2, 1910. Serial No. 590,341.

*To all whom it may concern:*

Be it known that I, FRITZ ULLMANN, a subject of the King of Bavaria, residing at Charlottenburg, near Berlin, Germany, my post-office address being Schillerstrasse 15/16, Charlottenburg, near Berlin, Germany, have invented certain new and useful Improvements in New Products of the Anthraquinone Series and Processes of Making the Same, of which the following is a specification.

My present invention relates to new products of the anthraquinone series and the process for the manufacture of the same consists in acting upon an anthraquinone-alpha-carboxylic acid, that is to say upon

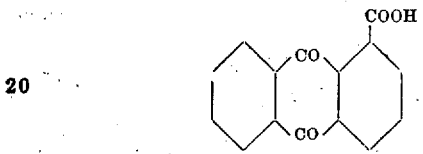

or a derivative of this acid, with a hydrazin, such as for instance phenylhydrazin or bromphenylhydrazin, etc. The reaction which is the base of my invention appears to take place according to the following equation:

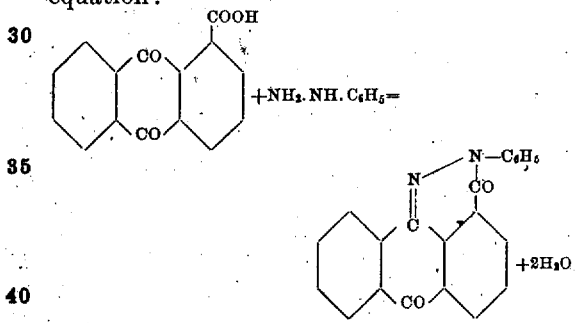

starting for instance from antraquinone-alpha-carboxylic acid and phenylhydrazin. These new bodies may serve as intermediate products for the manufacture of dyes or as dyestuffs.

The following example serves to illustrate my invention, the parts being by weight: 25 parts of anthraquinone-alpha-carboxylic acid, 250 parts of glacial acetic acid, 32 parts of phenylhydrazin are heated together to the boil at the reflux condenser. The antraquinone-alpha-carboxylic acid at first dissolves, then after some time the product of condensation separates in the form of yellow needles, which are drained, washed with water and finally extracted with boiling soda-solution. The new product thus obtained forms yellow needles, which are insoluble in water, alcohol and ether; it melts at 286° C. (uncorrected) and is easily soluble on heating in anilin and pyridin to a yellow solution. In concentrated sulfuric acid the product dissolves to an orange solution having a weak green fluorescence.

It is obvious that my present invention is not limited to the foregoing example or to the details given therein. Thus, for instance, instead of phenylhydrazin I can employ phenylhydrazin-sulfonic acid or bromphenylhydrazin or hydrazin itself, etc. Furthermore for the anthraquinone-alpha-carboxylic acid used in the above example I can substitute for instance 1.4-chloranthraquinone carboxylic acid or 1.5-nitro-anthraquinone carboxylic acid or the chlorid of anthraquinone-alpha-carboxylic acid, etc. In using such other parent materials for my new process, of course, the special conditions of reaction may be altered within wide limits, without departing from the scope of my invention, according to the nature of the parent materials as well as of the products to be obtained.

Having now described my invention and the manner in which it may be performed what I claim is,—

1. As new articles of manufacture the new products of the anthraquinone series, having the general formula:

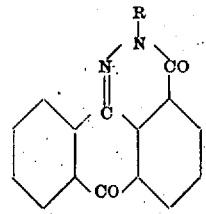

in which formula R means a non-metallic substituent, which new products may be obtained by acting with a hydrazin upon an anthraquinone-alpha-carboxylic acid, these new products being in the dry shape when pulverized, yellowish to yellow powders, very difficultly soluble in alcohol and ether and soluble in pyridin to a yellow solution, whereas they dissolve in concentrated sulfuric acid to a yellow to an orange solution having a weak fluorescence.

2. As new articles of manufacture the new products of the anthraquinone series, having the general formula:

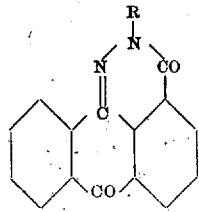

in which formula R means an aromatic radical, which new products may be obtained by acting with an aromatic hydrazin upon an anthraquinone-alpha-carboxylic acid, these new products being in the dry shape when pulverized, yellowish to yellow powders, very difficultly soluble in alcohol and ether and soluble in pyridin to a yellow solution, whereas they dissolve in concentrated sulfuric acid to a yellow to an orange solution having a weak fluorescence.

3. As a new article of manufacture the new product of the anthraquinone series, having the formula:

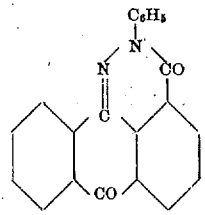

which new product may be obtained by acting with phenylhydrazin upon an anthraquinone-alpha-carboxylic acid, this new product being in the dry shape when pulverized, a yellowish to yellow powder, very difficultly soluble in alcohol and ether and soluble in pyridin to a yellow solution, whereas it dissolves in concentrated sulfuric acid to a yellow to an orange solution having a weak fluorescence.

In testimony whereof I have hereunto set my hand in presence of two subscribing witnesses.

FRITZ ULLMANN.

Witnesses:
 HENRY HASPER,
 WOLDEMAR HAUPT.